United States Patent
Wei et al.

(10) Patent No.: US 10,990,106 B2
(45) Date of Patent: Apr. 27, 2021

(54) MOBILE UNIT, INVENTORY MANAGEMENT SYSTEM AND THE METHOD FOR MOBILE UNIT LOCALIZATION

(71) Applicant: Zhejiang Guozi Robot Technology Co., Ltd., Hangzhou (CN)

(72) Inventors: Lei Wei, Hangzhou (CN); Yikun Tao, Hangzhou (CN); Hongbo Zheng, Hangzhou (CN); Xia Wang, Hangzhou (CN); Lingfen Zhu, Hangzhou (CN); Xinfeng Du, Hangzhou (CN); Zhenhua Shen, Hangzhou (CN)

(73) Assignee: ZHEJIANG GUOZI ROBOT TECHNOLOGY CO., LTD., Hangzhou (CN)

( * ) Notice: Subject to any disclaimer, the term of this patent is extended or adjusted under 35 U.S.C. 154(b) by 137 days.

(21) Appl. No.: 15/305,400

(22) PCT Filed: Oct. 9, 2016

(86) PCT No.: PCT/CN2016/101605
§ 371 (c)(1),
(2) Date: Oct. 20, 2016

(87) PCT Pub. No.: WO2018/064840
PCT Pub. Date: Apr. 12, 2018

(65) Prior Publication Data
US 2019/0094873 A1    Mar. 28, 2019

(51) Int. Cl.
| | |
|---|---|
| *G05D 1/02* | (2020.01) |
| *G06T 7/70* | (2017.01) |
| *H04N 5/247* | (2006.01) |
| *G01D 5/347* | (2006.01) |
| *G06T 7/73* | (2017.01) |
| *G06K 9/00* | (2006.01) |
| *G06K 9/32* | (2006.01) |

(52) U.S. Cl.
CPC .......... *G05D 1/0236* (2013.01); *G01D 5/347* (2013.01); *G05D 1/0234* (2013.01); *G06K 9/00664* (2013.01); *G06T 7/70* (2017.01); *G06T 7/73* (2017.01); *H04N 5/247* (2013.01); *G05D 2201/0216* (2013.01); *G06K 2009/3225* (2013.01); *G06T 2207/30204* (2013.01); *G06T 2207/30244* (2013.01)

(58) Field of Classification Search
CPC .. G05D 1/0236; G05D 1/0234; G05D 1/0274; G05D 1/0297; G05D 1/0217; G05D 2201/0216; G06Q 10/087; G06Q 10/08; G06Q 50/28; G05B 19/41895; B62B 3/02; G06T 7/70; G06T 7/73; G06T 2207/30204; G06T 2207/30244; G06K 9/00664; G06K 2009/3225; H04N 5/247; G01D 5/347
USPC .......................................... 348/148; 280/35
See application file for complete search history.

(56) References Cited

U.S. PATENT DOCUMENTS

| | | | |
|---|---|---|---|
| 9,487,356 B1* | 11/2016 | Aggarwal | B65G 1/0464 |
| 2008/0001372 A1* | 1/2008 | Hoffman | G06Q 10/087 |
| | | | 280/35 |
| 2015/0317527 A1* | 11/2015 | Graumann | G06K 9/00832 |
| | | | 348/148 |
| 2018/0053141 A1* | 2/2018 | Shydo, Jr. | G05D 1/104 |
| 2018/0336420 A1* | 11/2018 | Pandharipande | G06F 21/6245 |

FOREIGN PATENT DOCUMENTS

| | | |
|---|---|---|
| CN | 104089623 A | 10/2014 |
| CN | 104102217 A | 10/2014 |
| CN | 105242673 A | 1/2016 |
| CN | 205121338 U | 3/2016 |

* cited by examiner

*Primary Examiner* — Oschta I Montoya
(74) *Attorney, Agent, or Firm* — Cantor Colburn LLP

(57) ABSTRACT

The present invention discloses a mobile unit, an inventory management system, and a method for mobile unit localization. Sensors are immovably disposed in the workplace, actively identifying the positions of the mobile units. The individual sensor disposed in the workplace can monitor the positions of a plurality of mobile units simultaneously, and the number of sensors is only related to the size of workspace, which is independent of the number of mobile units. Since no complicated position calculations are needed for the mobile units, it reduces the requirements for on-board processors, which is more advantageous to monitor the preexisting non-automated vehicles or retrofit them into automated vehicles. With the method of the present invention, position calculations are not carried out on the bodies of AGVs, the requirements for the on-board controllers of AGVs are low, and it is easier to retrofit the non-intelligent mobile units, and thereby position monitoring and autonomous operation are implemented.

14 Claims, No Drawings

MOBILE UNIT, INVENTORY MANAGEMENT SYSTEM AND THE METHOD FOR MOBILE UNIT LOCALIZATION

FIELD OF THE INVENTION

The present invention relates to the field of logistics storage, in particular, to a mobile unit, an inventory management system and the method for mobile unit localization.

DESCRIPTION OF THE PRIOR ART

The present invention relates to the applications of mobile robots in the field of logistics automation. AGV (Automated Guided Vehicle) is used for automated transportation of carried objects having materials on-board in the field of logistics automation. The prerequisite for AGV having the need of automatic operation is the ability to identify the position coordinates of itself in the workspace, the conventional schemes comprise:

1, Guiding the AGVs to run autonomously via burying cables, magnetic tracks, visual leading lines in the ground and the like;

2, Determining the position coordinates of robots via arranging reflective labels in the workspace and AGV on-board laser radars;

3, Determining the coordinates of the AGVs via disposing two-dimensional codes on the ground which is identified by the AGV on-board cameras;

The prior art techniques primarily utilize on-board sensors to identify the positions of the AGVs, one sensor can only monitor the positions of one AGV, and the number of sensors are the same as the number of AGVs within the workplace, of which the costs are excessively high; meanwhile, since the bodies of the AGVs need to carry out complicated position calculations, requirements for on-board processors is very high, which is unfavorable for monitoring the pre-existing non-automated vehicles or retrofitting them into automated vehicles.

Therefore, those skilled in the art are devoted to developing a mobile unit, an inventory management system and the method for mobile unit localization to reduce the number of sensors required by warehousing systems and the overall costs substantially, and meanwhile, AGVs do not carry out position calculations, lowering the requirements for on-board processors, which is favorable for the automation retrofit of the existing vehicles.

SUMMARY OF THE INVENTION

In view of the above-mentioned drawbacks in the prior art, the technical problem to be solved by the present invention is how to perform position localization of the mobile units within the warehousing spaces while reducing the number of sensors and upfront costs.

In order to attain the above-mentioned goal, the present invention provides a method for mobile unit localization, the management units obtain the positions of the mobile units via sensors, the sensors comprising first sensors and second sensors, the first sensors distributed over the mobile units and the carried objects, and each of the first sensors obtains the positions of the mobile units and the carried objects within an area; when the mobile units are located below the carried objects, the second sensors located on the mobile units obtain relative positions of the mobile units and the carried objects, the management units obtain the positions of the mobile units by calculating the positions of the carried objects and relative positions of the mobile units and the carried objects; the mobile units and the carried objects have fiducial marks.

Furthermore, the sensors are active sensors.

Furthermore, the sensors are cameras or laser radars.

Furthermore, the first sensors are disposed on the ceilings or the movable pan/tilts in the workplace.

Furthermore, the fiducial marks comprise first fiducial marks, second fiducial marks and third fiducial marks, the first fiducial marks are located on the top of the mobile units, the second fiducial marks are located on the top of the carried objects, and the third fiducial marks are located on the bottom of the carried objects.

Furthermore, the fiducial marks are pattern marks, machine-readable code marks or literal marks.

Furthermore, the fiducial marks are two-dimensional codes.

Furthermore, the first sensors transfer the captured images containing the fiducial marks to the management units, the management units identify the images, and calculate the positions and/or orientations of the mobile units or the carried objects in the workspace.

The present invention also provides an inventory management system, comprising sensors, mobile units, carried objects and management units, the sensors comprising first sensors and second sensors, the first sensors configured to be distributed over the mobile units and the carried objects, each of the first sensors configured to obtain the positions of the mobile units and the carried objects within an area; when the mobile units are located below the carried objects, the second sensors located on the mobile unit configured to obtain relative positions of the mobile units and the carried objects, the management units configured to obtain the positions of the mobile units by calculating the positions of the carried objects and relative positions of the mobile units and the carried objects; the mobile units and the carried objects having fiducial marks.

Furthermore, the sensors are active sensors.

Furthermore, the sensors are cameras or laser radars.

Furthermore, the first sensors are disposed on the ceilings or the movable pan/tilts in the workplace.

Furthermore, the fiducial marks comprise first fiducial marks, second fiducial marks and third fiducial marks, the first fiducial marks are located on the top of the mobile units, the second fiducial marks are located on the top of the carried objects, and the third fiducial marks are located on the bottom of the carried objects.

Furthermore, the fiducial marks are pattern marks, machine-readable code marks or literal marks.

Furthermore, the fiducial marks are two-dimensional codes.

Furthermore, the first sensors transfer the captured images containing the fiducial marks to the management units, the management units identify the images, and calculate the positions and/or orientations of the mobile units or the carried objects in the workspace.

The present invention also provides a mobile unit, comprising second sensors and first fiducial marks, the second sensors configured to capture images containing third fiducial marks on the carried objects, and transfer the images or results of image recognition to the management units; the first fiducial marks located on the top of the mobile units.

Furthermore, the sensors are active sensors.

Furthermore, the sensors are cameras or laser radars.

Furthermore, the first fiducial marks are pattern marks, machine-readable code marks or literal marks.

The present invention immovably disposes the sensors in the workplace, actively identifies the positions of AGVs, which will reduce the costs in places with large number of AGVs effectively. Since the individual sensors deployed in the workplace can monitor the positions of a plurality of AGVs simultaneously, it reduces the number of sensors significantly, and meanwhile, since the bodies of AGVs have no need of carrying out complicated position calculations, it also reduces the requirements for on-board processors, which is favorable for monitoring the preexisting non-automated vehicles or retrofitting them into automated vehicles. In addition, the number of sensors is only related to the size of workspace, which is independent of the number of AGVs. When the number of AGVs is intensive, there will be larger cost advantages. The requirements for AGV on-board controllers are low. Since the calculation complexity of position calculations is generally high, with the method of the present invention, the position calculations are not carried out on the bodies of AGVs, the requirements for the AGVs on-board controllers are low, and it is easier to retrofit the non-intelligent mobile units, and thereby position monitoring and autonomous operation are implemented.

DETAILED DESCRIPTION OF THE PREFERRED EMBODIMENTS

The present invention provides a mobile unit, an inventory management system as well as the method for identifying the position coordinates of the mobile units in the workplace.

In the context of applications, the typical workplace is logistics workplace, the mobile units (mobile robots, AGVs) transport the inventory holders or other carried objects in the workplace automatically.

The carried objects can be inventory holders, trays or other devices or mechanisms for carrying goods.

AGVs have a walk unit as well as a mechanism for docking with the carried objects. The mobile units (AGV) walk to the starting point, dock with the carried objects, and then walk to the endpoints together with the carried objects, disengage from the carried objects, and thereby complete the process of transporting the carried objects by AGVs. The mobile units can be autonomously operating (AGV) or semiautomatic semi-manual.

The ways of docking comprise AGVs lifting the carried objects off the ground by lifting, or alternatively, completing docking via articulated traction.

The prerequisite for AGVs moving autonomously in the workplace is the ability to real-time identify the position coordinates of itself, AGVs calculate a path or track via the position coordinates of itself and the position coordinates of destinations, and control AGVs to move to the destinations along the track.

In order to identify the position coordinates of AGVs, the present invention arranges one or more active sensors in the workspace. The positions of arrangement can be ceilings or other places where it is easy to sense the information of AGVs; sensors can be visual sensors (for example, camera) or laser radars.

A typical embodiment is to arrange cameras on the ceiling in grids. Cameras can be stationary type, or can also be mounted on the pan/tilts (thereby covering a larger area). Each of the cameras is in charge of sensing one specific area in the workplace.

For the convenience of identifying the positions of AGVs, relevant marks can be disposed on the bodies of AGVs. For example, when sensors are visual sensors, a two-dimensional code or other easily recognizable color codes can be placed on fixed positions on the bodies of AGVs.

The active sensors (for example, cameras) disposed in the workplace perform active sensing (for example, capturing image) to AGVs operating in the workplace, and then transfer the sensing information to a management system.

The management system is connected to the sensors disposed in the workplace via networks or other communication means. After performing the active sensing to AGVs, the sensors send the sensor data to the management system. The management system calculates the accurate position coordinates of AGVs through certain algorithms and steps.

For example, in a typical embodiment, cameras disposed on the ceilings capture the two-dimensional codes disposed on the top of AGVs, the management system identifies the two-dimensional code images, and obtain the image coordinates of the four angular points of the two-dimensional codes. The image coordinates are transformed into global coordinates of AGVs in the workplace, through homography transformation, and the orientations of AGVs are calculated at the same time.

The management system sends global coordinates and angular degrees of AGVs acquired by calculating to the bodies of AGVs via wireless communication, and then the bodies of AGVs perform path planning and track planning according to the coordinates.

When AGVs are docking with carried objects via lifting (for example, AGVs walk to the bottom of the inventory holders, docking with the inventory holders via lifting), since the bodies of AGVs are shielded by the carried objects, resulting in sensors disposed in the workplace being unable to sense the position information of AGVs directly, in which case, it is necessary to provide another method to perform AGV localization, and the method is described below:

The sensors are disposed on the bodies of AGVs, and the sensors can sense relative positions of carried objects relative to AGVs. In a typical embodiment, an upward-looking camera is disposed on the AGVs, when AGVs are on the bottom of inventory holders (may be in lifted position or not-lifted state), it captures the marks disposed on the bottom of inventory holders, thereby obtain the relative position relationships of AGVs and the inventory holders.

The sensors disposed in the workplace perform active sensing to carried objects, and the position coordinates of carried objects in the workplace are calculated by the management system. For example, two-dimensional codes disposed on the top of the inventory holders are identified by the cameras disposed on the ceilings, and thereby absolute position coordinates of inventory holders in the workplace are obtained.

The absolute position coordinates of AGVs in the workplace can be calculated through the absolute position coordinates of carried objects in the workplace, as well as relative position coordinates of AGVs relative to the carried objects.

Therefore, there are two ways to obtain the absolute position coordinates of AGVs in the workplace:

(1). When AGVs can be sensed by the sensors disposed in the workplace directly, the absolute position coordinates of AGVs in the workplace are identified and calculated by sensors directly (2). When AGVs are unable to be sensed by the sensors disposed in the workspace directly due to being shielded, by way of indirect calculation: the coordinates of an intermediate object are calculated through the sensors disposed in the workplace. Relative coordinates of AGVs to the intermediate object are calculated through the sensors disposed on the bodies of AGVs, and then the absolute position coordinates of AGVs in the workplace are calculated through these two coordinates.

An embodiment of typical mobile unit localization according to the present invention is as follows:

The workplace is an automated warehouse, wherein a large number of inventory holders are placed, on which different kinds of goods are laid.

In the workplace, there are a series of AGVs which are able to insinuate themselves into the bottom of the inventory holders, lift the inventory holders off the ground by lifting, and then walk to the destinations together with the inventory holders.

The pickup function of the automated warehouse is completed through automated transportation of the inventory holders by AGVs.

An upward-looking camera is mounted on the AGV, a two-dimensional code is placed on the bottom of the inventory holders, and another two-dimensional code is placed on the top of the inventory holders.

A series of cameras are disposed on the ceilings of the automated warehouse, and each of the cameras is disposed on a pan/tilt. Cameras are arranged in grids, each of the cameras covering a certain spatial dimension.

Cameras disposed on the ceilings are connected to the management system through network communications, and the management system is connected to AGVs through wireless communication When the system starts to run, the cameras mounted on the ceilings capture the images of the covered area continuously, and transfer the images to the management system.

The management system identifies the two-dimensional code present in the images.

If the two-dimensional code corresponds to an AGV, then the global position coordinates of the AGV in the workplace can be obtained through homography transformation directly.

If the two-dimensional code corresponds to an inventory holder, then the global position coordinates of the inventory holder in the workplace can be obtained through another homography transformation.

Therefore, when AGVs are not on the bottom of the inventory holder, the position coordinates of the AGVs can be identified by the cameras disposed on the ceilings directly. However, when AGVs are on the bottom of the inventory holders, due to being shielded, the cameras on the ceilings are unable to obtain the position coordinates of the AGVs. At this point, AGVs, through the upward-looking cameras, identify the relative position relationships of AGVs and the inventory holders above them, the cameras on the ceilings, through the two-dimensional code on the top of the inventory holders, identify the absolute position coordinates of the inventory holders in the workplace, the absolute position coordinates of the AGVs in the workplace can be obtained by calculation with the above two coordinates.

The management system sends absolute position coordinates corresponding to AGVs to the AGVs in real time, which perform path planning and track planning via the position coordinates.

The preferred specific embodiments are described in greater detail hereinbefore. It is to be understood that many modifications and changes can be made by those of ordinary skill in the art, according to the conception of the present invention, without any creative labor. Therefore, any and all of the technical proposals that can be obtained by those skilled in the art, through logical analyses, reasoning or limited experiments, on the basis of the prior art, according to the conception of the present invention, are to be covered by the scope of protection defined by the claims.

The invention claimed is:

1. A method for mobile unit localization, wherein the method comprising steps of:
   a management unit obtains the position of the mobile unit via sensors,
   the sensors comprise first sensors and second sensors, the first sensors are disposed on ceilings or movable pan/tilts in the workplace, and arranged in grids, each of the first sensors obtains positions of the mobile unit and carried objects within an area of the workplace; wherein the mobile unit and the carried objects have fiducial marks;
   when the mobile unit are located below the carried objects, the second sensors located on the mobile unit obtain relative positions of the mobile unit and the carried objects, and the first sensors obtain absolute positions of the carried objects in the workplace by identifying the fiducial marks of the carried objects, so that the management units obtain the position of the mobile unit by calculating the absolute positions of the carried objects and the relative positions of the mobile unit and the carried objects, as well as orientations of the mobile unit or the carried objects in the workspace.

2. The method for mobile unit localization according to claim 1, wherein the sensors are active sensors.

3. The method for mobile unit localization according to claim 1, wherein the sensors are cameras or laser radars.

4. The method for mobile unit localization according to claim 1, wherein the fiducial marks comprise first fiducial marks, second fiducial marks and third fiducial marks, the first fiducial marks are located on the top of the mobile unit, the second fiducial marks are located on the top of the carried objects, and the third fiducial marks are located on the bottom of the carried objects.

5. The method for mobile unit localization according to claim 1, wherein the fiducial marks are pattern marks, machine-readable code marks or literal marks.

6. The method for mobile unit localization according to claim 1, wherein the fiducial marks are two-dimensional codes.

7. The method for mobile unit localization according to claim 1, wherein the first sensors transfer the captured images containing the fiducial marks to the management units, the management units identify the images and calculate the positions and/or orientations of the mobile units or the carried objects in the workspace.

8. An inventory management system, wherein
   the inventory management system comprises sensors, mobile units, carried objects and management units,
   wherein the sensors comprise first sensors and second sensors, the first sensors are disposed on ceilings or movable pan/tilts in the workplace, and arranged in grids, each of the first sensors is configured to obtain positions of the mobile unit and the carried objects within an area of the workplace; wherein the mobile unit and the carried objects have fiducial marks;
   wherein the inventory management system is configured that: when the mobile unit is located below the carried objects, the second sensors located on the mobile unit are configured to obtain relative positions of the mobile unit and the carried objects, and the first sensors are configured to obtain absolute positions of the carried objects in the workplace by identifying the fiducial marks of the carried objects, so that the management units obtain the position of the mobile unit by calculating the absolute positions of the carried objects and the relative positions of the mobile unit and the carried objects, as well as orientations of the mobile unit or the carried objects in the workspace.

9. The inventory management system according to claim 8, wherein the sensors are active sensors.

10. The inventory management system according to claim 8, wherein the sensors are cameras or laser radars.

11. The inventory management system according to claim 8, wherein the fiducial marks comprise first fiducial marks, second fiducial marks and third fiducial marks, the first fiducial marks are located on the top of the mobile unit, the second fiducial marks are located on the top of the carried objects, and the third fiducial marks are located on the bottom of the carried objects.

12. The inventory management system according to claim 8, wherein the fiducial marks are pattern marks, machine-readable code marks or literal marks.

13. The inventory management system according to claim 8, wherein the fiducial marks are two-dimensional codes.

14. The inventory management system according to claim 8, wherein the first sensors transfer the captured images containing the fiducial marks to the management units, the management units identify the images and calculate the positions and/or orientations of the mobile units or the carried objects in the workspace.

* * * * *